US012623418B2

(12) United States Patent
Olund et al.

(10) Patent No.: US 12,623,418 B2
(45) Date of Patent: May 12, 2026

(54) FUNCTIONAL LAYER APPLICATION SYSTEM

(71) Applicant: HOYA Optical Labs of America, Inc., Lewisville, TX (US)

(72) Inventors: David Olund, Ramsey, MN (US); Craig Drury, Ramsey, MN (US); James Kunkel, Ramsey, MN (US)

(73) Assignee: HOYA Optical Labs of America, Inc., Lewisville, TX (US)

( * ) Notice: Subject to any disclaimer, the term of this patent is extended or adjusted under 35 U.S.C. 154(b) by 79 days.

(21) Appl. No.: 18/528,356

(22) Filed: Dec. 4, 2023

(65) Prior Publication Data

US 2024/0181730 A1    Jun. 6, 2024

Related U.S. Application Data

(60) Provisional application No. 63/385,911, filed on Dec. 2, 2022, provisional application No. 63/385,916, filed on Dec. 2, 2022.

(51) Int. Cl.
B29D 11/00 (2006.01)

(52) U.S. Cl.
CPC .. B29D 11/00365 (2013.01); B29D 11/00432 (2013.01)

(58) Field of Classification Search
CPC .................... B29D 11/00365; B29D 11/00432
See application file for complete search history.

(56) References Cited

U.S. PATENT DOCUMENTS

| | | | |
|---|---|---|---|
| 5,324,473 A | 6/1994 | Baresich | |
| 6,290,882 B1 * | 9/2001 | Maus | B29D 11/00269 |
| | | | 264/328.8 |
| 6,416,609 B1 * | 7/2002 | Imada | B29C 65/1483 |
| | | | 264/1.33 |
| 10,039,445 B1 | 8/2018 | Torch | |
| 11,947,194 B2 | 4/2024 | Newman | |
| 12,121,930 B2 | 10/2024 | Ishizaki et al. | |

(Continued)

FOREIGN PATENT DOCUMENTS

| | | |
|---|---|---|
| EP | 3640712 A1 | 4/2020 |
| EP | 3779567 A4 | 12/2021 |

(Continued)

OTHER PUBLICATIONS

WIPO, U.S. International Search Authority, International Search Report and Written Opinion mailed May 1, 2024 in International Patent Application No. PCT/US2023/082351, 7 pages.

(Continued)

*Primary Examiner* — Mathieu D Vargot
(74) *Attorney, Agent, or Firm* — Inskeep IP Group, Inc.

(57) ABSTRACT

Systems and methods for adding a functional layer to a lens having a plurality of microlenses for inhibition of ametropia. The lens may include defocus incorporated multiple segments (DIMS) having a plurality of microlenses or lenslets producing refraction areas with different refraction forces. Injection molding may be utilized to add a functional layer to such a DIMS lens having a plurality of microlenses or lenslets. The functional layer may add a functional utility to the lens, including but not limited to photochromic functionality, polarization functionality, and the like.

20 Claims, 7 Drawing Sheets

(56)        References Cited

U.S. PATENT DOCUMENTS

| | | |
|---|---|---|
| 2004/0125335 A1 | 7/2004 | Vu |
| 2013/0059068 A1 | 3/2013 | Yajima |
| 2017/0329051 A1 | 11/2017 | Vu et al. |
| 2018/0011343 A1 | 1/2018 | Orozco Rodriguez et al. |
| 2020/0198267 A1* | 6/2020 | Ishizaki ........... B29D 11/00326 |
| 2021/0260804 A1* | 8/2021 | Chang ................ B29C 33/3835 |
| 2021/0354409 A1 | 11/2021 | Guillot et al. |
| 2021/0354410 A1 | 11/2021 | Guillot et al. |
| 2021/0356763 A1 | 11/2021 | Le Saux et al. |
| 2024/0248326 A1 | 7/2024 | Qi et al. |

FOREIGN PATENT DOCUMENTS

| | | | |
|---|---|---|---|
| EP | 4083687 A4 | 3/2024 |
| EP | 4083688 A4 | 3/2024 |
| EP | 4083691 A4 | 4/2024 |
| JP | 2010-107974 A | 5/2010 |
| WO | WO 2019/166659 A1 | 9/2019 |
| WO | WO 2019/189764 A1 | 10/2019 |
| WO | WO 2019/189847 A1 | 10/2019 |

OTHER PUBLICATIONS

European Patent Office, Extended European Search Report dated Oct. 27, 2025 in European Patent Application No. 22899559.3, 9 pages.

* cited by examiner

| Iteration | Photochromic | Polarized Gray | Polarized Brown |
|---|---|---|---|
| Front Mold Temp (convex lens) (°F) | 287 | 287 | 289 |
| Rear Mold Temp (concave lens) (°F) | 282 | 282 | 282 |
| Shot Size (in) | 3.72 | 3.72 | 3.72 |
| Velocity #1 (in/s) | 0.50 | 0.50 | 0.50 |
| Velocity #2 (in/s) | 0.10 | 0.10 | 0.10 |
| Velocity #3 (in/s) | 0.30 | 0.55 | 0.55 |
| Velocity #4 (in/s) | 0.40 | 0.85 | 0.85 |
| Velocity #5 (in/s) | 0.35 | 0.75 | 0.75 |
| Transfer Position (in) | 0.30 | 0.65 | 0.65 |
| Pack Pressure #1 (PSI) | 1500 | 1500 | 1500 |
| Pack Time #1 (s) | 10 | 10 | 10 |
| Pack Pressure #2 (PSI) | 3500 | 3500 | 3500 |
| Pack Time #2 (s) | 15 | 15 | 15 |
| Pack Pressure #3 (PSI) | 8500 | 8500 | 8500 |
| Pack Time #3 (s) | 40 | 40 | 40 |
| Cooling (s) | 240 | 240 | 240 |

FIG. 7

FUNCTIONAL LAYER APPLICATION SYSTEM

RELATED APPLICATIONS

This application claims benefit of and priority to U.S. Provisional Application Ser. No. 63/385,911 filed Dec. 2, 2022 entitled Functional Layer Application System, and U.S. Provisional Application Ser. No. 63/385,916 filed Dec. 2, 2022 entitled Functional Layer Application System, both of which are hereby incorporated herein by reference in their entireties.

BACKGROUND OF THE DISCLOSURE

Various lenses known in the art to inhibit ametropia of the eye, and thus treat myopia, have been known to include a plurality of microlenses or lenslets which are positions on a curved lens. Such a configuration may be utilized to form two or more refracting areas, such as a first refraction area and a second refraction area. The first refraction area may have a first refraction force based on a prescription for correcting ametropia of the eyes. The second refraction area may have a refraction force different from the first refraction force so as to focus images on the positions except the retina of the eyes and thereby inhibit development of ametropia.

In modern times, it is often desirable to add different functional layers to lenses. For example, a photochromic functional layer may be desirable on certain lenses to allow the lenses to darken on exposure to light. As another example, a polarized functional layer may be desirable on certain lenses to filter light, protect against ultraviolet rays, and minimize glare.

It would be desirable to efficiently add a functional layer, such as a photochromic or polarized layer, to lenses for inhibiting ametropia, such as lenses having microlenses or lenslets.

SUMMARY OF THE DISCLOSURE

Disclosed herein are systems and methods for adding a functional layer to a lens for treating myopia and inhibiting ametropia.

The lens may comprise a defocus incorporated multiple segments ("DIMS") lens for inducing myopic defocus in the peripheral retina as an intervention to stop or slow myopic progression, such as in children.

The lens for treating myopia and inhibiting ametropia may comprise a plurality of microlenses or lenslets producing refraction areas having different refraction forces.

In an example embodiment, laminate technology may be utilized to deliver both a photochromic and a polarized solution by replicating DIMS features that are less than 2 microns or less in depth.

The molding systems and processes shown and described herein may produce the same tight tolerances as a clear DIMS lens, while incorporating a functional layer.

The molding systems and processes shown and described herein may produce a functional DIMS lens which has the same PSF performance (e.g., fit-defocus, stray light rate, and segment rate) as that of a clear DIMS lens.

The functional layer may add a functional utility to the lens, including but not limited to photochromic functionality, polarization functionality, and the like.

In an example embodiment, injection molding may be utilized to add a functional layer to a DIMS lens having a plurality of microlenses.

In an example embodiment, the front mold temperature may be increased as compared to prior techniques, with the front mold temperature being between about 285 and 292 degrees Fahrenheit.

In an example embodiment, the maximum amount of injected polycarbonate may be increased for fabricating a photochromic DIMS lens and decreased for fabricating a polarized DIMS lens, with the maximum amount of injected polycarbonate being about 3.720 inches, for example, with a four-cavity cold runner system.

In an example embodiment, the speed of injection may be decreased as compared to prior techniques, with the speed of injection being about 0.1 inches per second.

In an example embodiment, the transfer position may be decreased for fabricating a photochromic DIMS lens and increased for fabricating a polarized DIMS lens, with the transfer position being between about 0.52 inches and 0.58 inches.

In an example embodiment, the cooling time of the mold may be decreased when compared to prior techniques, with the cooling time being between about 240 seconds and 260 seconds.

In an example embodiment, a plurality of pack plastic pressures may be applied sequentially for a plurality of durations of time, rather than a single iteration of pack plastic pressure being applied for a single duration of time as used in prior techniques.

In an example embodiment, a first pack plastic pressure of between about 1250 PSI and 1750 PSI may first be applied for a duration of between about 8 seconds and 12 seconds, a second pack plastic pressure of between about 3250 PSI and 3750 PSI may next be applied for a duration of between about 13 seconds and 17 seconds, and a third pack plastic pressure of between about 8250 PSI and 8750 PSI may next be applied for a duration of between about 38 seconds and 42 seconds. However, it should be appreciated that such values are optimized for a four cavity molding and may differ when used in connection with a two cavity or single cavity molding.

BRIEF DESCRIPTION OF THE DRAWINGS

These and other aspects, features and advantages of which embodiments of the disclosure are capable of will be apparent and elucidated from the following description of embodiments of the present disclosure, reference being made to the accompanying drawings, in which

FIG. 7 is a table illustrating cycle settings for lenses having polarized (gray and brown) and photochromic functional layers according to an example embodiment.

DETAILED DESCRIPTION

Figure 1:
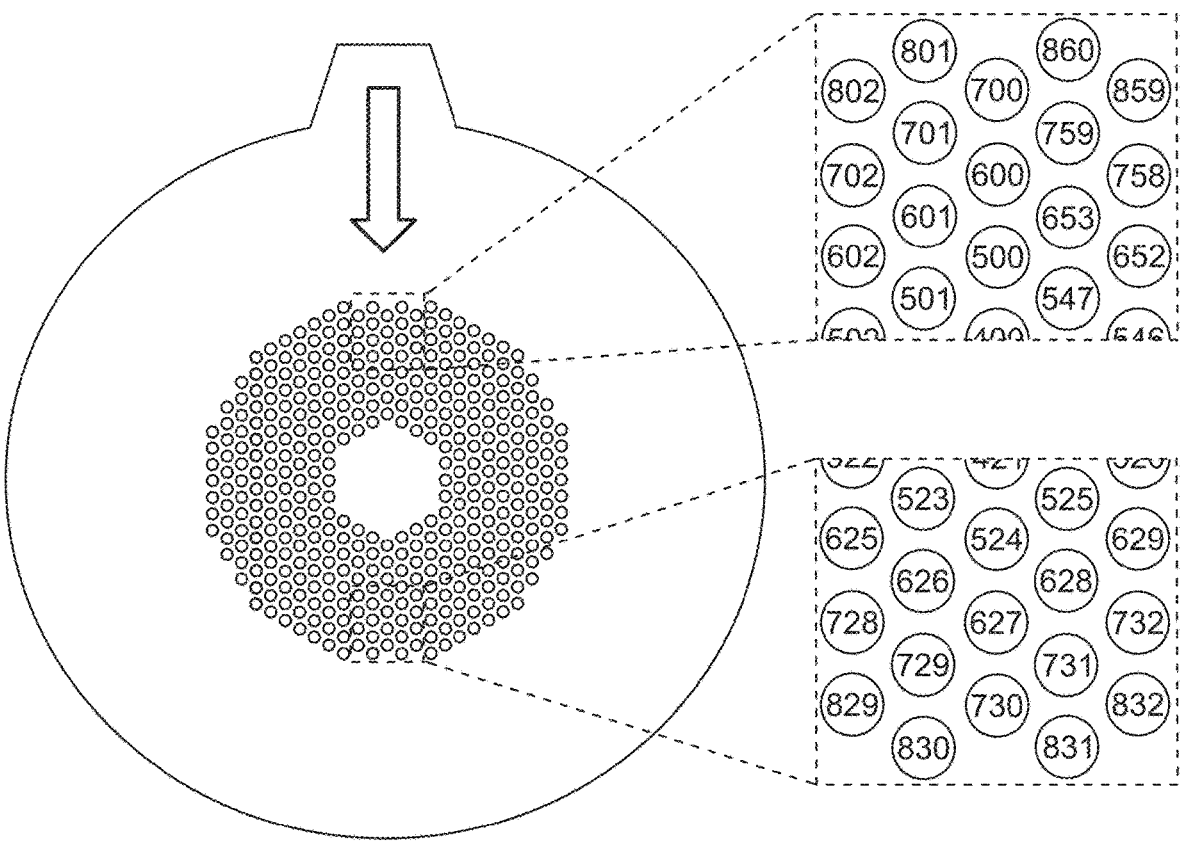
FIG. 1 is a plan view illustrating injecting molding to apply a functional layer to a lens according to an example embodiment.

Specific embodiments of the disclosure will now be described with reference to the accompanying drawings.

This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. The terminology used in the detailed description of the embodiments illustrated in the accompanying drawings is not intended to be limiting of the disclosure. In the drawings, like numbers refer to like elements.

For the purposes of this specification, use of the terms "about", "around", or "approximately" when referring to a value may be understood to mean within 5% of the stated value (either greater or lesser), inclusive.

Disclosed herein are systems and methods for adding a functional layer or laminate to various types of lenses, including lenses for treating myopia and/or inhibiting ametropia. While the systems and methods disclosed herein are particularly suitable for lenses having microlenses or lenslets with two or more refraction areas, it should be appreciated that such systems and methods may be utilized to add a functional layer to a wide range of lenses, including those which are not necessarily for treatment of a condition such as myopia.

It should also be appreciated that the systems and methods disclosed herein may be utilized to add a wide range of different types of functional layers or laminates to such lenses. By way of example, the functional layer may comprise a polarizing medium, decorative medium, tint medium, color medium, photochromic medium, filtering medium, and the like.

The figures and description focus on two broad types of functional layers: photochromic and polarized. However, various other types of functional layers may be added to a wide range of lenses using the systems and methods disclosed herein, and thus the scope should not be construed as limited specifically to photochromic and/or polarized functional layers.

The systems and methods disclosed herein may relate to various optical elements that have been fabricated using injection molding techniques which are known in the art. Such optical elements, including lenses, may be fabricated to provide a functional property, with the functional property being incorporated in the optical element by, e.g., adherence of a laminate to an optical power lens element. As a further example, the optimal element could comprise a coated wafer that improves the final hardness and durability of the lens. In some embodiments, the laminate itself could be a hard coated wafer.

One known method of fabricating such an optical element may comprise the steps of laminating a first thermoplastic sheet to one side of a functional member, laminating a second thermoplastic sheet to an opposite side of the functional member to form a laminate insert, providing a mold, placing the laminate into a front concave curved cavity of the mold, and injecting a molten thermoplastic into the mold against the laminate insert prior to allowing to cool. The functional member may have a functional property, such as but not limited to a polarizing medium, decorative medium, tint medium, color medium, photochromic medium, filtering medium, and the like.

Examples of methods and systems known in the art for use of injection molding to produce an optical element, which may include a functional layer, are shown and/or described in U.S. Pat. Nos. 8,029,705, 5,286,419, 5,051,309, 4,873,029, and 3,940,304, all of which are hereby incorporated by reference.

An optical element, such as a spectacle lens, may incorporate a plurality of microlenses or lenslets which may be molded with a lens substrate. For example, an array of microlenses may be deposited as a film on a lens substrate, with each microlens of the array having a substantially similar focal point and being formed of a plurality of layers of different materials having different refractive indices relative to one another. An example ophthalmic lens having graded microlenses, and a method for fabricating the same, is disclosed in U.S. Pat. No. 10,386,654, which is hereby incorporated by reference.

An optical element, such as a spectacle lens, which incorporates microlenses may be configured for the treatment of myopia and/or the inhibition of ametropia of the eyes. The optical element may comprise a defocus incorporated multiple segments ("DIMS") lens, which may be configured to simultaneously introduce myopic defocus and provide clear vision for the wearer at all viewing distances. In such DIMS lenses, there may be multiple foci from myopic defocus at a plane in front of the retina, would be received as blur images on the retina.

For example, the microlenses may be configured to form a first refraction area, based on a prescription for correcting an abnormal refraction of an eye, and a plurality of second refraction areas, each having a refractive power which is different from the first refraction area. The second refraction areas may perform the function of focusing an image on a position other than the retina of the eye so as to suppress progression of the abnormal refraction of the eye. An example ophthalmic lens having microlenses configured to inhibit ametropia is disclosed in U.S. Pat. No. 11,029,540, which is hereby incorporated by reference.

Figure 2:
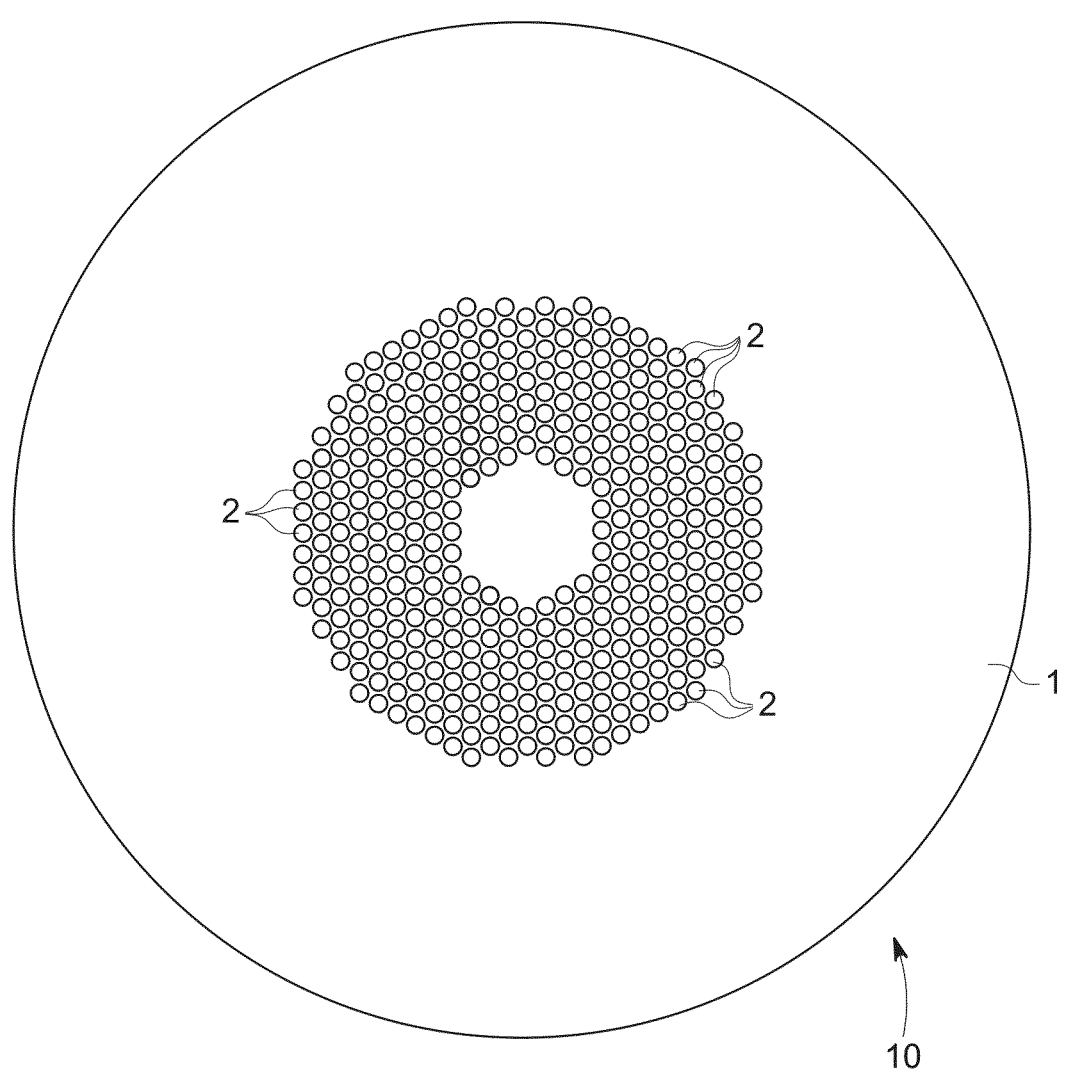
FIG. 2 is a plan view of a lens including a functional layer according to an example embodiment.
Figure 3:
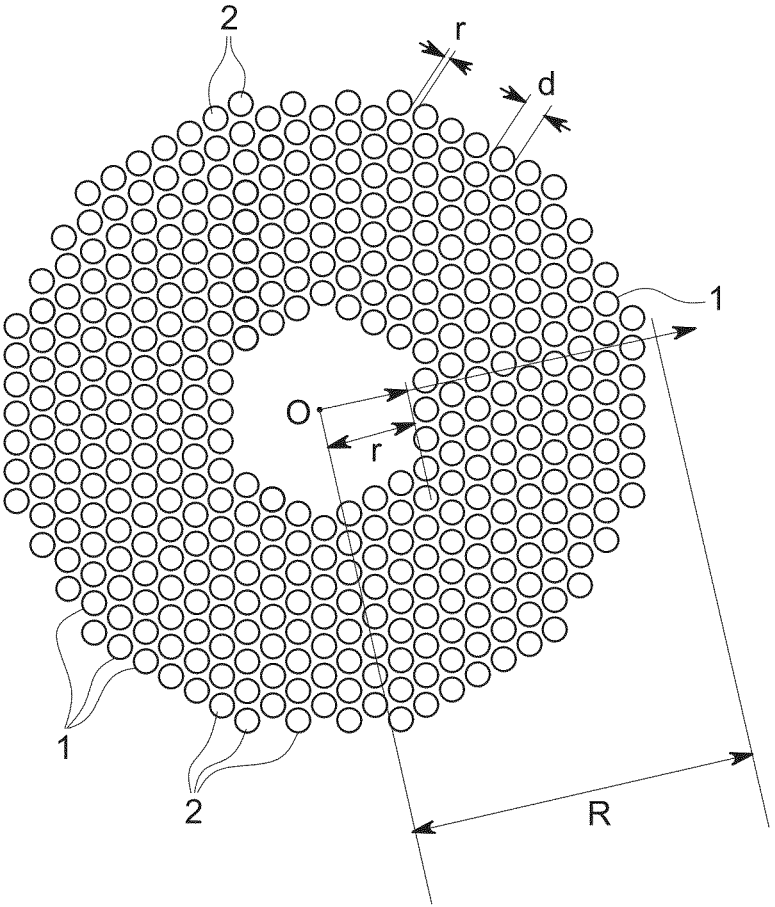
FIG. 3 is a partial expanded view of FIG. 2.
Figure 4A:
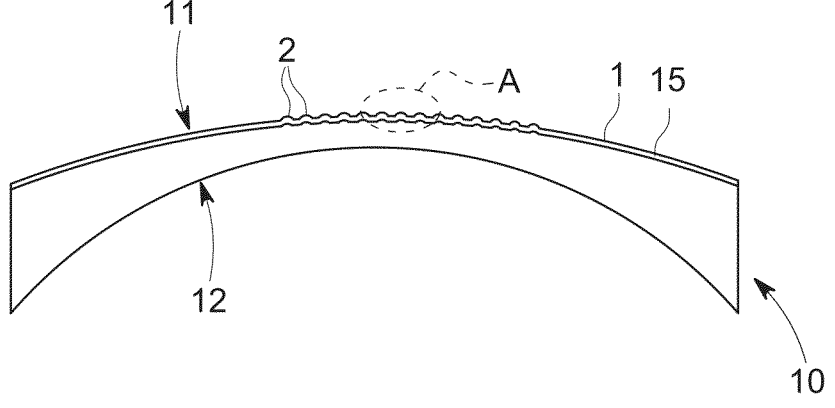
FIG. 4A is a cross-sectional view of the lens shown in FIG. 2.
Figure 4B:
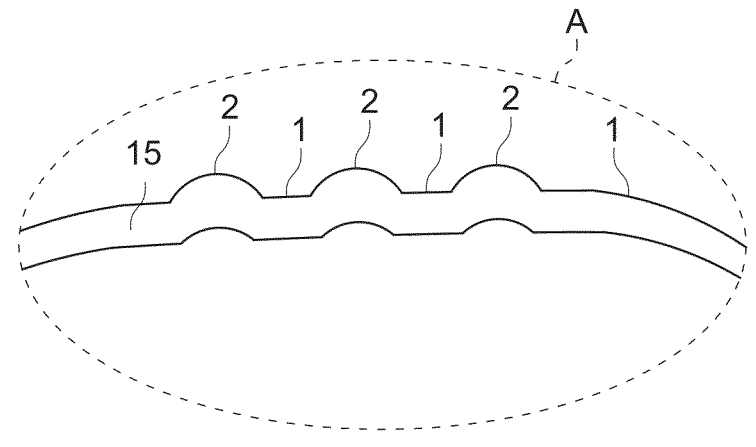
FIG. 4B is a partial expanded view of A-portion of FIG. 4A.
Figure 5:
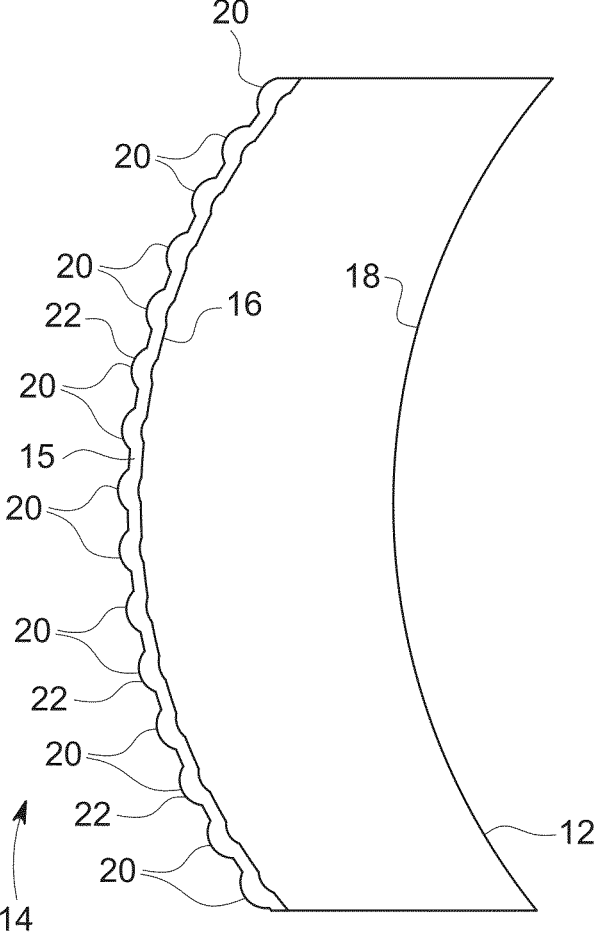
FIG. 5 is a partial side view of a lens including a functional layer according to an example embodiment.

FIGS. 1-5 illustrate example embodiments of optical elements which incorporate a plurality of microlenses 2 and may be configured to include a functional layer 15, such as a photochromic and/or polarized functional layer 15. FIG. 1 illustrates flow direction of a polycarbonate when incorporating such a functional layer 15 into a lens 10 having microlenses 2. FIG. 2 illustrates an example embodiment of a lens 10 incorporating a plurality of microlenses 2. FIG. 3 is a close-up view of FIG. 2, focusing on the microlenses 2. FIGS. 4A and 4B illustrate an example lens showing the incorporation of microlenses 2 thereon. FIG. 5 is a closer-up view illustrating microlenses 2 on a substrate 1.

Turning to FIG. 1, it can be seen that, during fabrication of the functional layer 15, polycarbonate will generally flow in a single direction such that segments of microlenses 2 may be filled sequentially. FIG. 1 illustrates the first segment area 20 to be filled, including individually numbered microlenses 2, and the final segment area 30 to be filled, including individually numbered microlenses 2.

During injection molding, conditions such as pack plastic pressure of the polycarbonate when filling a first segment area 20 may differ from the conditions when filling the final segment area 30. This may cause the final segment area 30 to not fully conform to the mold and thus may result in lower fit defocus than the rest of the segments. Thus, as shown in FIG. 1, the microlenses 2 of the final segment area 30 labelled as 524, 627, 730, etc. may result in a lower fit defocus than the microlenses 2 of the first segment area 20 labelled as 501, 601, 701, 801, etc.

Simply increasing pack plastic pressure or the temperature of the front mold until the fit defocus on the final segment area reaches a target may be undesirable as negative effects, such as molding defects, can occur. In order to compensate for the lack of conformity between first-filled and last-filled segment areas, cycle settings particularly suited for adding of a functional layer to a lens including microlenses without causing defects, such as those that would affect defocus, are herein disclosed.

FIGS. 2 and 3 illustrate an example embodiment of a DIMS lens 10 which includes a plurality of microlenses 2 arranged in a substantially donut-like, circular pattern, with FIG. 2 showing an overall lens and FIG. 3 showing a close-up of the microlenses 2. As can be seen in FIGS. 2 and 3, an example embodiment of a DIMS lens 10 may include a central zone for distance refractive correction, surrounded by a plurality of multiple defocus segments. Various dimensions may be utilized in such a lens. By way of example, the central zone may be about 4.5 mm in radius (r), and the defocus segments, taken together, may be about 16.5 mm in radius (R). Each of the microlenses 2 making up the defocus segments may about 1 micron deep and about 1 mm in diameter (d).

FIGS. 4A-5 provide closer views of an example embodiment of a DIMS lens 10 including an outer surface 11 and an inner surface 12, with the outer surface 11 incorporating multiple segment areas of microlenses 2 for the inhibition of ametropia. A functional layer 15, such as a polarized or photochromic layer, may be positioned to cover the microlenses 2.

As shown in FIG. 4A, a central area of the outer surface 11 of the lens 10 may incorporate such microlenses 2, with FIG. 4B illustrating a closer view of the central area which incorporates the microlenses 2. As discussed herein, each of the microlenses 2 may be approximately 1 micron deep in some embodiments, though other dimensions, such as 2 microns deep, may be utilized in different embodiments. FIG. 5 illustrates a side view of an example embodiment of a DIMS lens 10 which incorporates such microlenses 2 and includes a functional layer 15. The systems and methods described below may be utilized to add a functional layer 15 to any of the example lenses 10 shown in FIGS. 4A-5.

Disclosed herein are methods and systems for using laminate technology to incorporate functional features into a DIMS lens 10 having microlenses 2. The microlenses 2 may be created on the inside of the mold, with a functional laminate layer 15 being positioned inside the mold against the mold half having the microlenses 2 in it. The mold may then be closed and liquid polycarbonate may be introduced and allowed to cool, with the laminate structure being adhered to the microlenses 2. For example, the microlenses 2 may be carved into the front of the mold, with the laminate layer 15 being added and then combined and melted during injection.

Spectral filtering may also be applied in some embodiments. For example, filtering in defocus power but not in base curve. In this manner, properties may be imparted that aid in myopia control and are specific to DIMS lenses 10. For example, the film may include small dots that filter blue light which are aligned with each of the microlenses 2.

Specific example embodiments are described further below. However, it should be understood that any of the features from any of the embodiments can be mixed and matched with each other in any combination. Hence, the present disclosure should not be restricted to only these embodiments, but any broader combination thereof.

Figure 6:
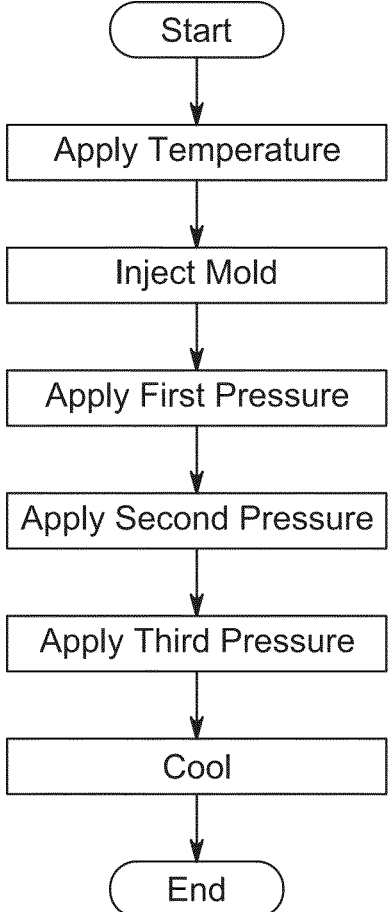
FIG. 6 is a table illustrating cycle settings for a lens having a photochromic functional layer according to an example embodiment.

FIG. 6 is a flowchart illustrating an example method of fabricating a lens having a plurality of microlenses in combination with a functional layer (e.g., a photochromic and/or polarized functional layer). It should be appreciated that various steps of the flow chart may be modified in different embodiments or performed in different orders. By way of example, the number of applications of different pressures may be adjusted in different embodiments.

Continuing to reference FIG. 6, it can be seen that a temperature may first be applied to the mold. As discussed below, different temperatures may be applied to the front and rear sides of the mold, respectively The temperatures may generally comprise an elevated temperature such as between 260 and 300 degrees Fahrenheit. However, such an elevated temperature may vary depending on the material properties of the optical insert. For example, the elevated temperature being between 260 and 300 degrees Fahrenheit may be optimal for beryllium-copper. Different values may be optimal for other materials such as stainless steel and the like.

Once the desired temperature is reached, the mold may be injected, such as with a polycarbonate. During injection, a plurality of pack plastic pressures may be applied for a plurality of durations. By way of example, a first pack plastic pressure of between 1250 PSI and 1750 PSI may be applied for a duration of between 8 and 12 seconds, a second pack plastic pressure of between 3250 PSI and 3750 PSI may be applied for a duration of between 13 seconds and 17 seconds, and a third pack plastic pressure of between 8250 PSI and 8750 PSI may be applied for a duration of between 38 seconds and 42 seconds.

After application of the different pack plastic pressures, which assist in ensuring optimal fit defocus as the different segments of the mold are filled, the mold may be cooled. The duration of cooling may vary in different embodiments. For example, the duration of cooling may vary depending on base curve blank geometry, e.g., thickness, diameter, etc. In an example embodiment, the cooling duration may be between 240 seconds and 260 seconds.

Generally, the method of fabrication may differ in various respects when compared with previous fabrication methods used to produce clear DIMS lenses. Such modifications may be utilized to accommodate for addressing the aforementioned defects that may occur if prior techniques suitable for clear lenses are replicated when adding a functional layer.

By way of example, the front mold temperature may be increased for producing a functional DIMS lens as compared to the front mold temperature used for fabricating a similar lenses without DIMS features. The shot size (i.e., the maximum amount of injected polycarbonate) may be increased for fabricating a photochromic DIMS lens and decreased for fabricating a polarized DIMS lens. The velocity, or speed of injection, may be decreased as compared to prior techniques. The transfer position may be decreased for photochromic and increased for polarized. The cooling time of the mold may be decreased when compared to previous techniques.

Pack pressure may be utilized during the mold injection process. Previous systems and methods have relied on a single iteration of pack plastic pressure for a single duration of time. The pack plastic pressure and duration may be decreased as compared to prior techniques. Further, as discussed below, the systems and methods described herein for applying functional utility to DIMS lenses may add additional iterations of pack plastic pressures. For example, a second iteration of pack plastic pressure, different from the first, may be applied for a second duration of time, different from the first. As a further example, a third iteration of pack plastic pressure, different from the first and second, may be applied for a third duration of time, different from the first and second.

Generally, the systems and methods described herein may be utilized with a flat film decorative molding, which may reduce cost as compared to other configurations. The flat film may be formed within the mold. For example, application of different pressures as described below may function to bend the film, with the film being friction fit into the mold cavity.

FIG. 7 illustrates exemplary cycle settings for various example embodiments. It should be appreciated that the cycle settings shown in FIG. 7 and described below are merely for exemplary purposes only, and thus should not be construed as limiting in scope. Some or all of the parameters shown in the cycle settings of FIG. 7 may be adjusted in various embodiments. For example, the values shown in FIG. 7 may be optimized for specific runner designs, blank geometry, and/or four cavity molding. It should be appreciated that such values may be higher or lower to optimize for variations such as use of less cavities. Thus, it should be appreciated that, while the values shown in FIG. 7 and described below may be optimized for four cavity molding, they may be higher or lower depending on parameters such as number of cavities, blank geometry, runner designs, and the like.

FIG. 7 illustrates example cycle settings for incorporating a photochromic functional layer in a lens having microlenses. As shown in FIG. 7, the front mold temperature, which may be associated with the convex lens portion, may be about 287 degrees Fahrenheit. However, in some embodiments, a range between 285-287 degrees Fahrenheit may be utilized. The rear mold temperature, which may be associated with the concave lens portion, may be about 282 degrees Fahrenheit. However, in some embodiments, a range between 280-285 degrees Fahrenheit may be utilized. The shot size may be about 3.720 inches. However, in other embodiments, the shot size may be between 3.5 inches and 4 inches.

As shown in FIG. 7, injection velocities may be dependent upon various factors such as the number of cavities and other properties. In the illustrated embodiment, five iterations of injections are illustrated. For a photochromic functional layer, a first injection velocity may be about 0.5 inches/second, a second injection velocity may be about 0.1 inches/second, a third injection velocity may be about 0.3 inches/second, a fourth injection velocity may be about 0.4 inches/second, and a fifth injection velocity may be about 0.35 inches/second. Thus, it can be seen that the first injection velocity may be higher than the remaining injection velocities. However, as mentioned above, it should be appreciated that such values may vary depending on a number of factors such as number of cavities and the like.

Continuing to reference FIG. 7, it can be seen that the transfer position may be about 0.30 inches. In some embodiments, the transfer position may be between 0.2 inches and 0.8 inches. The transfer position may vary depending on various factors, such as but not limited to the number of cavities, material properties, and the like.

As previously mentioned, the pack plastic pressure during fabrication can have an effect on fit defocus on different segment areas of microlenses. In an example embodiment for adding a photochromic functional layer as shown in FIG. 7, three separate pack plastic pressures may be applied for three different durations of time. It should be appreciated, however, that more or less separate pack plastic pressures may be applied in different embodiments.

In an example embodiment for adding a photochromic functional layer, a first pack plastic pressure of about 1500 PSI may be applied for a duration of about 10 seconds, a second pack plastic pressure of about 3500 PSI may be applied for a duration of about 15 seconds, and a third pack plastic pressure of about 8500 PSI may be applied for a duration of about 40 seconds.

However, these values may be adjusted in different embodiments. For example, the first pack plastic pressure may be between 1250 PSI and 1750 PSI and applied for a duration between 8 seconds and 12 seconds. As another example, the second pack plastic pressure may be between 3250 PSI and 3750 PSI and applied for a duration between 13 seconds and 17 seconds. As yet another example, the third pack plastic pressure may be between 8250 PSI and 8750 PSI and applied for a duration between 38 seconds and 42 seconds.

After multiple iterations of pack plastic pressure being applied for different durations of time, the mold may be allowed to cool. The cooling time and temperature may vary in different embodiments. In an example embodiment, the cooling time may last for a duration of about 240 seconds. However, in some embodiments, the cooling time may extend for a longer duration of between about 220 seconds and 260 seconds.

FIG. 7 also illustrates example cycle settings for incorporating a gray polarized functional layer in a lens having microlenses. As shown in FIG. 7, the front mold temperature, which may be associated with the convex lens portion, may be about 287 degrees Fahrenheit. However, in some embodiments, a range between 285-287 degrees Fahrenheit may be utilized. The rear mold temperature, which may be associated with the concave lens portion, may be about 282 degrees Fahrenheit. However, in some embodiments, a range between 280-285 degrees Fahrenheit may be utilized. The shot size may be about 3.720 inches. However, in other embodiments, the shot size may be between 3.5 inches and 4 inches.

As shown in FIG. 7, injection velocities may be dependent upon various factors such as the number of cavities and other properties. In the illustrated embodiment, five iterations of injections are illustrated. For a gray polarized functional layer, a first injection velocity may be about 0.5 inches/second, a second injection velocity may be about 0.1 inches/second, a third injection velocity may be about 0.55 inches/second, a fourth injection velocity may be about 0.85 inches/second, and a fifth injection velocity may be about 0.75 inches/second. Thus, it can be seen that the first injection velocity may be lower than the remaining injection velocities and that the fourth injection velocity may be higher than the remaining injection velocities. However, as mentioned above, it should be appreciated that such values may vary depending on a number of factors such as number of cavities and the like.

Continuing to reference FIG. 7, it can be seen that the transfer position may be about 0.65 inches. In some embodiments, the transfer position may be between 0.2 inches and 1.0 inches. The transfer position may vary depending on various factors, such as but not limited to the number of cavities, material properties, and the like.

As previously mentioned, the pack plastic pressure during fabrication can have an effect on fit defocus on different segment areas of microlenses. In an example embodiment for adding a gray polarized functional layer as shown in FIG. 7, three separate pack plastic pressures may be applied for three different durations of time. It should be appreciated, however, that more or less separate pack plastic pressures may be applied in different embodiments.

In an example embodiment for adding a gray polarized functional layer, a first pack plastic pressure of about 1500 PSI may be applied for a duration of about 10 seconds, a second pack plastic pressure of about 3500 PSI may be applied for a duration of about 15 seconds, and a third pack plastic pressure of about 8500 PSI may be applied for a duration of about 40 seconds.

However, these values may be adjusted in different embodiments. For example, the first pack plastic pressure may be between 1250 PSI and 1750 PSI and applied for a duration between 8 seconds and 12 seconds. As another example, the second pack plastic pressure may be between 3250 PSI and 3750 PSI and applied for a duration between 13 seconds and 17 seconds. As yet another example, the third pack plastic pressure may be between 8250 PSI and 8750 PSI and applied for a duration between 38 seconds and 42 seconds.

After multiple iterations of pack plastic pressure being applied for different durations of time, the mold may be allowed to cool. The cooling time and temperature may vary in different embodiments. In an example embodiment, the cooling time may last for a duration of about 240 seconds. However, in some embodiments, the cooling time may extend for a longer duration of between about 220 seconds and 260 seconds.

FIG. 7 also illustrates example cycle settings for incorporating a brown polarized functional layer in a lens having microlenses, which are largely similar to the cycle settings for a gray polarized functional layer except for the front mold temperature.

As shown in FIG. 7, the front mold temperature, which may be associated with the convex lens portion, may be about 289 degrees Fahrenheit. However, in some embodiments, a range between 286-292 degrees Fahrenheit may be utilized. The rear mold temperature, which may be associated with the concave lens portion, may be about 282 degrees Fahrenheit. However, in some embodiments, a range between 280-285 degrees Fahrenheit may be utilized. The shot size may be about 3.720 inches. However, in other embodiments, the shot size may be between 3.5 inches and 4 inches.

As shown in FIG. 7, injection velocities may be dependent upon various factors such as the number of cavities and other properties. In the illustrated embodiment, five iterations of injections are illustrated. For a brown polarized functional layer, a first injection velocity may be about 0.5 inches/second, a second injection velocity may be about 0.1 inches/second, a third injection velocity may be about 0.55 inches/second, a fourth injection velocity may be about 0.85 inches/second, and a fifth injection velocity may be about 0.75 inches/second. Thus, it can be seen that the first injection velocity may be lower than the remaining injection velocities and that the fourth injection velocity may be higher than the remaining injection velocities. However, as mentioned above, it should be appreciated that such values may vary depending on a number of factors such as number of cavities and the like.

Continuing to reference FIG. 7, it can be seen that the transfer position may be about 0.65 inches. In some embodiments, the transfer position may be between 0.2 inches and 1.0 inches. The transfer position may vary depending on various factors, such as but not limited to the number of cavities, material properties, and the like.

As previously mentioned, the pack plastic pressure during fabrication can have an effect on fit defocus on different segment areas of microlenses. In an example embodiment for adding a brown polarized functional layer as shown in FIG. 7, three separate pack plastic pressures may be applied for three different durations of time. It should be appreciated, however, that more or less separate pack plastic pressures may be applied in different embodiments.

In an example embodiment for adding a brown polarized functional layer, a first pack plastic pressure of about 1500 PSI may be applied for a duration of about 10 seconds, a second pack plastic pressure of about 3500 PSI may be applied for a duration of about 15 seconds, and a third pack plastic pressure of about 8500 PSI may be applied for a duration of about 40 seconds.

However, these values may be adjusted in different embodiments. For example, the first pack plastic pressure may be between 1250 PSI and 1750 PSI and applied for a duration between 8 seconds and 12 seconds. As another example, the second pack plastic pressure may be between 3250 PSI and 3750 PSI and applied for a duration between 13 seconds and 17 seconds. As yet another example, the third pack plastic pressure may be between 8250 PSI and 8750 PSI and applied for a duration between 38 seconds and 42 seconds.

After multiple iterations of pack plastic pressure being applied for different durations of time, the mold may be allowed to cool. The cooling time and temperature may vary in different embodiments. In an example embodiment, the cooling time may last for a duration of about 240 seconds. However, in some embodiments, the cooling time may extend for a longer duration of between about 220 seconds and 260 seconds.

Although the disclosure has been described in terms of particular embodiments and applications, one of ordinary skill in the art, in light of this teaching, can generate additional embodiments and modifications without departing from the spirit of or exceeding the scope of the claimed disclosure. Accordingly, it is to be understood that the drawings and descriptions herein are proffered by way of example to facilitate comprehension of the disclosure and should not be construed to limit the scope thereof.

What is claimed is:

1. A method of fabricating a lens having microlenses with a functional layer, comprising the steps of:
   providing a mold having a first and a second side,
      wherein the first side includes a plurality of features configured to form a corresponding array of microlenses;
   setting the first side of the mold to a first temperature and the second side of the mold to a second temperature, wherein the second temperature is lower than the first temperature;
   providing a laminate having a functional layer at the first side of the mold;
   injecting a material into the mold at a velocity;
   applying a first pack pressure for a first duration of time;
   applying a second pack pressure for a second duration of time; and
   allowing the mold to cool thereby forming the lens having microlenses with a functional layer.

2. The method of claim 1, wherein the first temperature is between 280 degrees Fahrenheit and 300 degrees Fahrenheit.

3. The method of claim 1, wherein the first pack pressure is between 1250 PSI and 1750 PSI.

4. The method of claim 3, wherein the first duration of time is between 8 seconds and 12 seconds.

5. The method of claim 4, wherein the second pack pressure is between 3250 PSI and 3750 PSI.

6. The method of claim 5, wherein the second duration of time is between 13 seconds and 17 seconds.

7. The method of claim 1, wherein the first pack pressure is lower than the second pack pressure.

8. The method of claim 1, wherein the first duration of time is less than the second duration of time.

9. The method of claim 1, wherein the functional layer is comprised of a polarized functional layer or a photochromic functional layer.

10. A method of fabricating a lens having microlenses with a functional layer, comprising the steps of:

providing a mold having a first side and a second side, wherein the first side includes a plurality of features configured to form a corresponding array of micro-lenses;

setting the first side of the mold to a first temperature and the second side of the mold to a second temperature, wherein the second temperature is lower than the first temperature;

providing a laminate having a functional layer at the first side of the mold;

injecting a material into the mold;

applying a first pack pressure for a first duration of time;

applying a second pack pressure for a second duration of time;

applying a third pack pressure for a third duration of time; and allowing the mold to cool thereby forming the lens having microlenses with a functional layer.

11. The method of claim 10, wherein the step of injecting a material into the mold is repeated between two and five times.

12. The method of claim 10, wherein the first pack pressure is between 1250 and 1750 PSI.

13. The method of claim 12, wherein the first duration of time is between 8 and 12 seconds.

14. The method of claim 13, wherein the second pack pressure is between 3000 and 4000 PSI.

15. The method of claim 14, wherein the second duration of time is between 10 and 20 seconds.

16. The method of claim 15, wherein the third pack pressure is between 7000 and 10000 PSI.

17. The method of claim 16, wherein the third duration of time is between 30 and 50 seconds.

18. The method of claim 10, wherein the functional layer is comprised of a gray polarized functional layer, a brown polarized functional layer, or a photochromic functional layer.

19. The method of claim 1, wherein the first pack pressure is less than the second pack pressure.

20. The method of claim 1, wherein the first duration of time is less than the second duration of time.

\* \* \* \* \*